United States Patent [19]

Hackett

[11] 4,375,691

[45] Mar. 1, 1983

[54] METHOD AND DEVICE FOR FREQUENCY TRANSLATION

[75] Inventor: Brian K. Hackett, Ypsilanti, Mich.

[73] Assignee: Minnesota Mining & Manufacturing Co., Saint Paul, Minn.

[21] Appl. No.: 191,208

[22] Filed: Sep. 26, 1980

[51] Int. Cl.³ .............................................. H04B 3/50
[52] U.S. Cl. .................................... 375/8; 340/825.03; 340/825.08; 340/825.52; 370/69.1; 370/90; 455/31; 455/77; 455/131; 455/58
[58] Field of Search ...................... 455/3, 5, 49, 51, 53, 455/56, 57, 58, 31, 32, 33, 34, 73, 75, 77, 131, 118; 370/24, 30, 92, 70, 86, 89, 90, 69; 375/8, 9; 340/825.08, 825.03, 825.52

[56] References Cited

U.S. PATENT DOCUMENTS

| | | | |
|---|---|---|---|
| 2,686,257 | 8/1954 | Reichle | 455/77 |
| 3,808,537 | 4/1974 | Sarati et al. | 455/31 |
| 3,821,706 | 6/1974 | Bennett et al. | 340/163 |
| 3,990,046 | 11/1976 | Katz et al. | 340/147 |
| 4,013,957 | 3/1977 | Tojo | 455/76 |
| 4,028,500 | 6/1977 | McClure et al. | 455/33 |
| 4,035,727 | 7/1977 | Ishii | 455/76 |
| 4,130,733 | 12/1978 | Ashford | 370/69 |
| 4,293,948 | 10/1981 | Soderblom | 370/90 |

Primary Examiner—Benedict V. Safourek
Attorney, Agent, or Firm—Krass, Young & Schivley

[57] ABSTRACT

A digital communications system includes a plurality of master stations communicating with a plurality of terminals over a single communication line which carries a plurality of duplex communication channels, each corresponding to a particular master station. A frequency translator coupling each terminal with the communication line permits the remote station to selectively communicate over any of the channels by translating the frequency of a selected channel to that of the terminal's receiver and by translating the frequency of the terminal's transmitter to that of the selected channel. Upon selection of a particular channel, the terminal's transmitter is disabled for a duration sufficient to allow its receiver to pick up a resynchronization signal periodically sent out by the master station whose channel has been selected. The receiver then enables the transmitter in synchronism with any other terminals using the same channel. The translator employs a pair of multiple frequency oscillators controlled by a counter whose output corresponds to a selected channel. The counter is advanced by a manually operable switch, or alternatively, by a remotely generated digital word.

18 Claims, 5 Drawing Figures

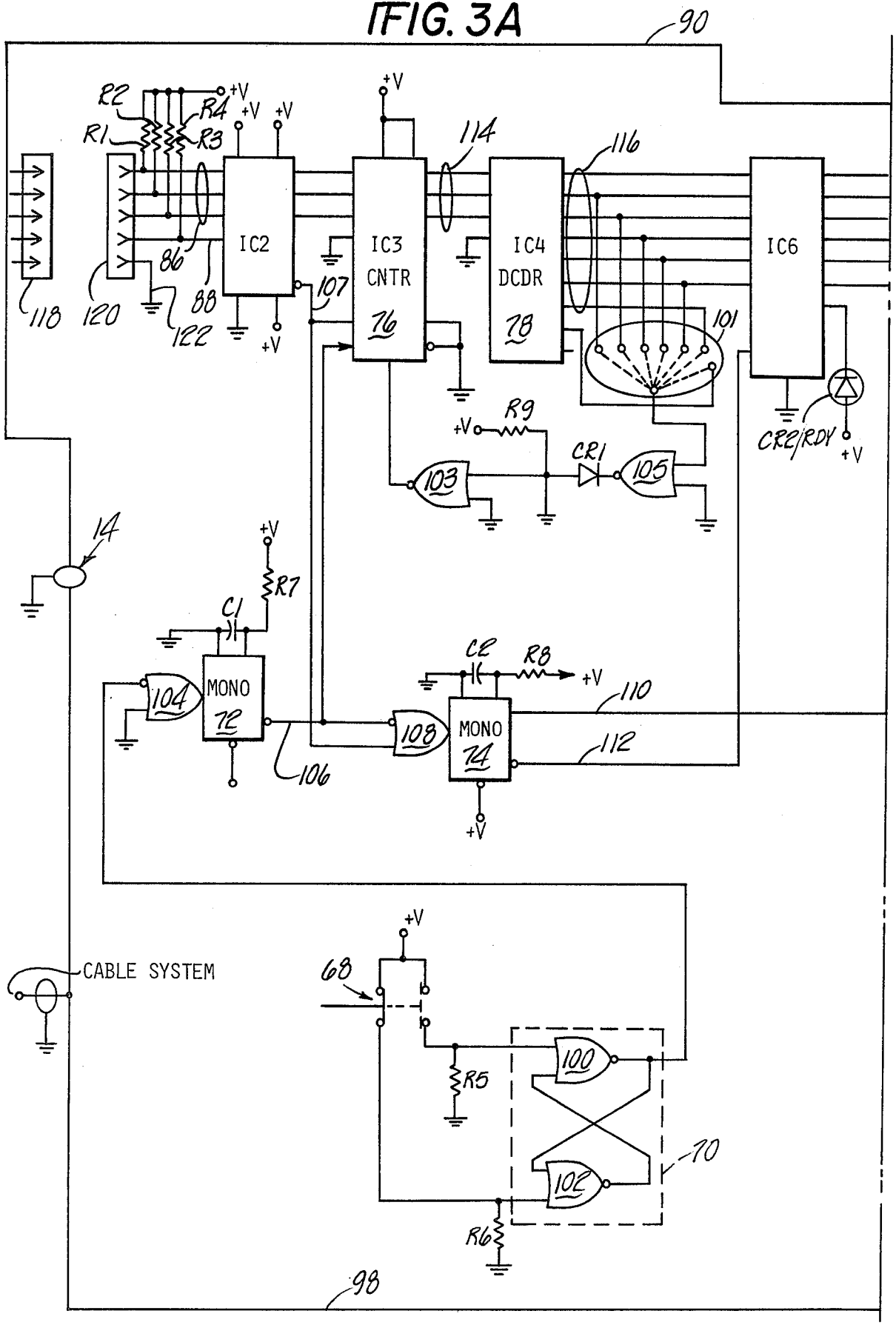

METHOD AND DEVICE FOR FREQUENCY TRANSLATION

TECHNICAL FIELD

The present invention generally relates to a digital communication system in which a plurality of master stations may communicate with any of a plurality of terminals over a single communication line carrying a plurality of duplex communication channels each corresponding to one of the master stations, and deals more particularly with a device implemented method for allowing any of the terminals to switch communication channels.

BACKGROUND ART

Digital communication systems in which one or more master stations communicate with a plurality of terminals over a single communication line is an art recognized concept. For example, U.S. Pat. No. 3,821,706 discloses a system similar to that mentioned above in which a plurality of remote terminals are connected to a central computer through a full duplex communication channel. Each terminal has a register which stores the unique address for that terminal, a counter, and a comparator circuit for determining the identity between the state of the counter and the address. The computer transmits messages to all of the remote terminals consisting of digital word groups preceded by a particular terminal address. These messages are received by all of the terminals and are only processed by the terminal so addressed. All of the terminals advance their counters in response to each word transmitted by the computer, whether that word is addressed to them or not. In the absence of a message to be sent to the terminals, the computer transmits an idle word which advances all of the counters. Upon the occurrence of identity between its counter and its address, a terminal will transmit any available message to the computer on the return channel. Periodically, a word is sent out by the computer resynchronizing all of the counters.

In one alternate embodiment, the central station communicates with a plurality of satellite stations, each of which services a plurality of terminals and interrogates them in sequence, one each time that satellite's counter coincides with its address. In another embodiment, all of the terminals connected to a particular satellite are sequentially interrogated as the counter in the satellite is advanced by sequential words generated by the computer, and then the computer transmits the address of another satellite causing its terminal to be sequentially interrogated.

The present invention comprises an improvement over U.S. Pat. No. 3,821,706, the entire disclosure of which is hereby incorporated by reference. In some communication applications, it is desirable for one or more remote terminals to be able to communicate with any of a plurality of computers or master stations over a single communication line. In this type of installation, each computer or master station would communicate with one or more of the terminals over a particular data channel, with the several communication channels being multiplexed over the communication line. Also, it is desirable for any one of the terminals to be able to communicate with any of the master stations, however, this has not been possible heretofore in systems of the type described above since the transmit and receive frequencies of a particular terminal are not compatible with each of the master station's channels. Thus, in the past, it was not possible for a terminal to switch channels so as to communicate with any of the master stations.

DISCLOSURE OF THE INVENTION

The present invention provides a novel digital communication system of the general type discussed above in which any of the terminals may switch communication channels to allow communication with any of the master stations. In accordance with the present invention, a frequency translator couples each terminal with the communication line to permit the terminal to selectively communicate over any of the channels by translating the frequency of the selected channel to that of the terminal's receiver and by translating the frequency of the terminal's transmitter to that of the selected channel. After a particular channel has been selected, the terminal's transmitter is disabled for a time interval sufficient to allow its receiver to pick up a resynchronization signal periodically sent out by the master station whose channel has been selected. The receiver then enables the transmitter for transmission, in synchronism with any other terminals using the same channel. The translator employs a pair of multiple frequency oscillators controlled by a counter whose output corresponds to a selected channel. The counter is advanced by a manually operable switch, or alternatively, by a remotely generated digital word.

BRIEF DESCRIPTION OF THE DRAWINGS

In the drawings, which form an integral part of the specification and are to be read in conjunction therewith, and in which like parts are designated by identical reference numerals in the various views:

FIGS. 3A and 3B form, when placed in side-by-side relationship, a detailed schematic diagram of the circuit for the translator shown in FIGS. 1 and 2.

BEST MODE FOR CARRYING OUT THE INVENTION

Figure 1:
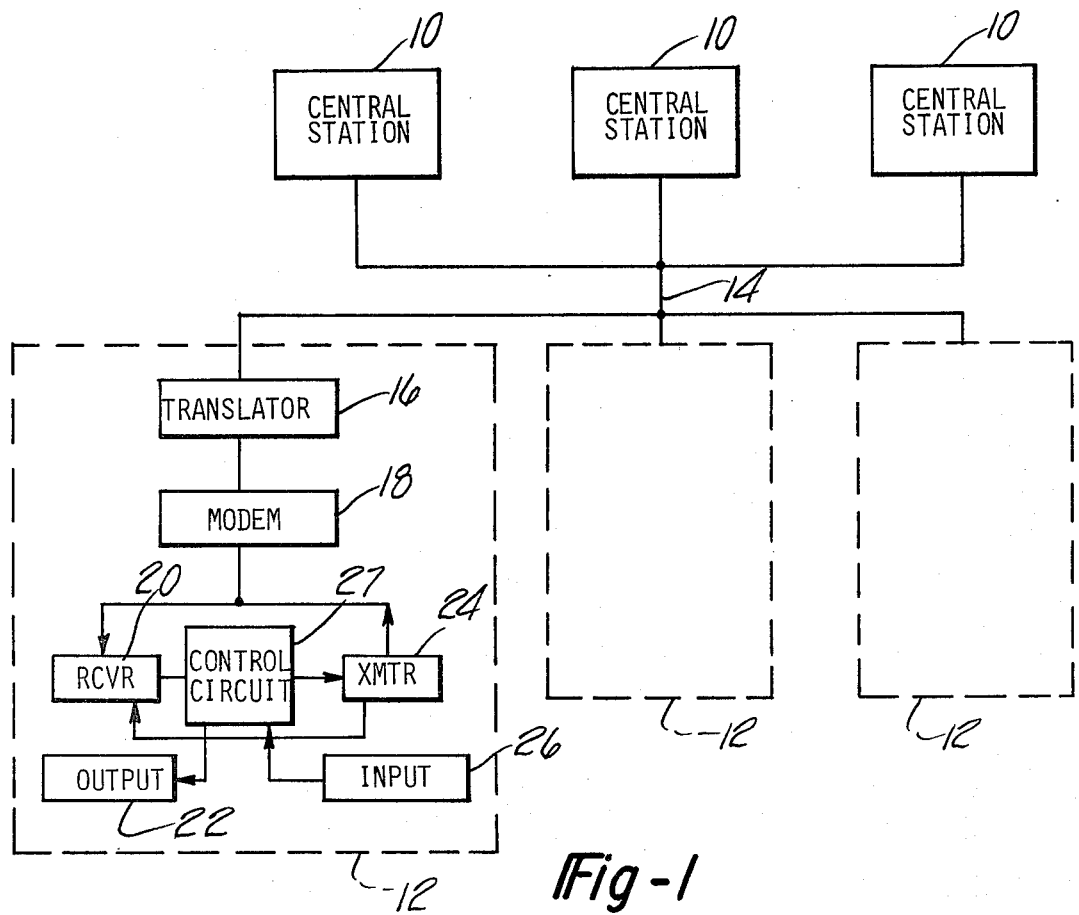
FIG. 1 is a block diagram of a digital communication system of which the translator of the present invention forms a significant part.

Referring first to FIG. 1, the present invention is concerned with a digital communication system in which a plurality of central stations 10 communicate with a plurality of remote stations or terminals, each generally designated by the broken lines 12, over a single communication line 14.

Each of the central stations 10 may comprise a computer and associated controls as described in U.S. Pat. No. 3,821,706. Thus, the central stations 10 may include an address generator, a data generator, an idle word generator, a counter, a reset word generator, along with a transmitter and receiver for sending interrogation messages to each of the terminals 12, and for receiving responsive messages from such terminals. However, although a plurality of the central stations 10 are shown in FIG. 1, it is to be understood that the present invention is also useful in connection with a single computer in which a plurality of output ports thereof are communicatively coupled by line 14 to the terminals 12. Communication line 14 consists of a single communication path and may comprise a coaxial cable, optical fiber, or the like.

Each of the terminals 12 comprises a translator 16 coupled between a modem 18 and communication line 14. Additionally, each terminal 12 includes a receiver 20 coupled through a control circuit 27 to an output 22 which may take the form of a cathode ray tube, printer or audio output, and also includes a transmitter 24 coupled by control circuit 27 to an input 26 which may be in the form of a keyboard or the like. Control circuit 27 comprises a circuit arrangement such as that described in U.S. Pat. No. 3,821,706, including a decoder, address storage, a comparator, a counter, gating means, a transmit character register, and a transmit storage register.

In operation, each of the central stations 10 transmits and receives messages over a communication channel uniquely related to that master station over the communication line 14. Thus, communication line 14 carries a plurality of communication channels, using time division multiplex, or frequency division multiplex techniques. Each of the terminals 12 may communicate with any of the master stations 10 using the communication channel corresponding to the station 10 with which it desires to communicate. The receiver 20 and transmitter 24 of each terminal 12 operate on a pair of fixed frequencies. Each communication channel associated with the master station 10 carried by the communication line 14 is also of a unique frequency range or bandwidth. The translator 16 provides a means of selecting the particular channel to be used for communication by the corresponding terminal 12, thereby determining the particular central station 10 with which it is to communicate. As will become apparent hereinafter, the translator 16 functions to translate the transmission frequency of transmitter 24 to the frequency of the selected channel, and further functions to translate the frequency of the selected channel to the reception frequency of the receiver 20.

Figure 2:
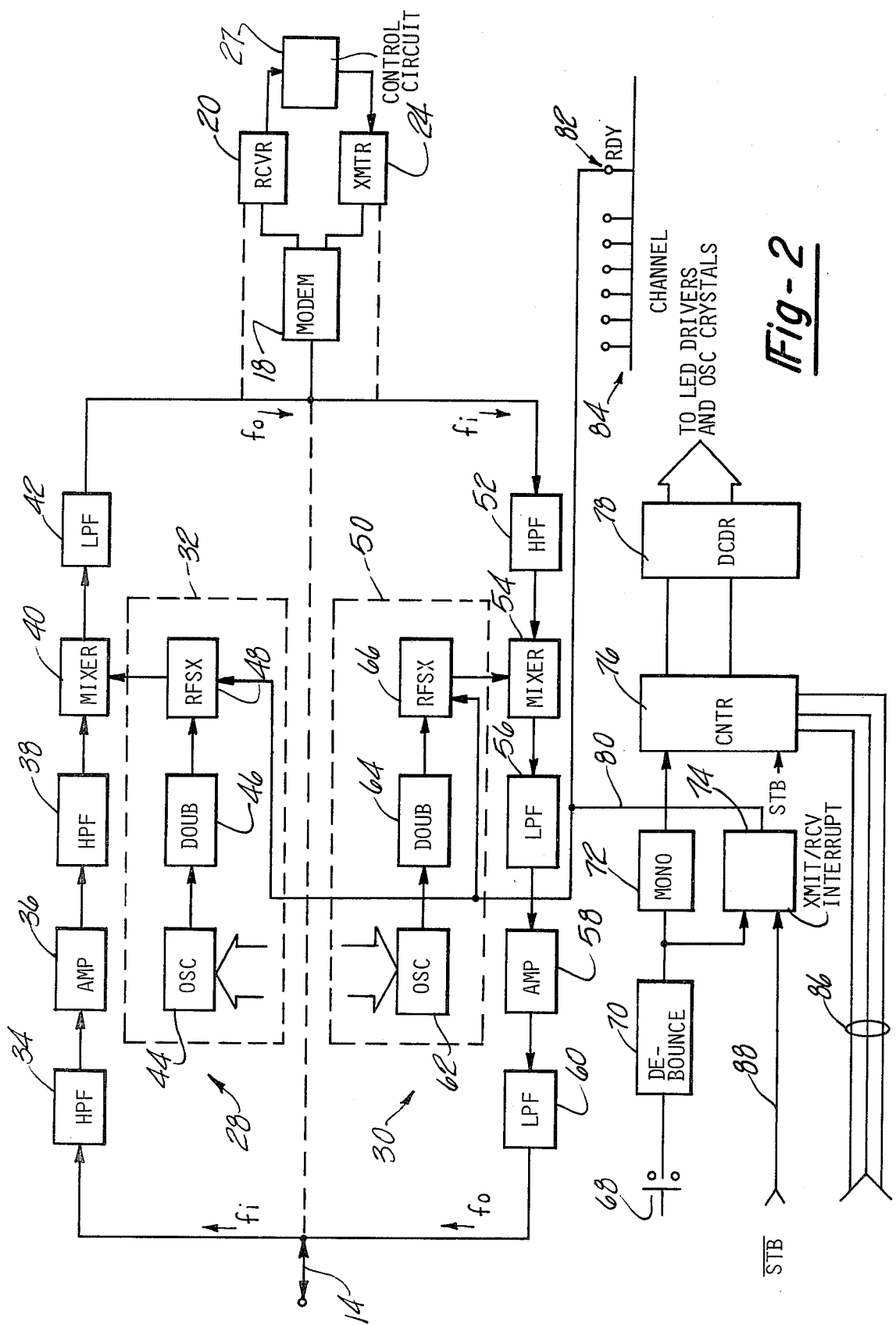
FIG. 2 is a block diagram of the translator shown in FIG. 1.

Referring also now to FIG. 2, the translator 16 broadly comprises a first and second frequency translator means, respectively designated by the numerals 28 and 30 which are coupled in parallel relationship with each other between the modem 18 and communication line 14. The first frequency translator means is operable for translating the frequency of a selected channel, designated by $f_i$, to the frequency of the receiver 20, designated by $f_o$, and comprises a multiple frequency oscillator generally designated within the broken line 32, a first high-pass filter 34, an amplifier 36, a second high-pass filter 38, a mixer 40, and a low-pass filter 42. Multiple frequency oscillator 32 includes a plurality of oscillator circuits 44 whose outputs are delivered to a doubler circuit 46 which functions to amplify and double the frequency of the output signals, thence to an RF (radio frequency) switch 48. The output of the RF switch 48 is delivered to mixer 40.

Similarly, the second translator circuit means 30 comprises a multiple frequency oscillator 50, in combination with a high-pass filter 52, a mixer 54, a first-low-pass filter 56, an amplifier 58, and a second low-pass filter 60. The multiple frequency oscillator 50 includes a plurality of oscillator circuits 62 each operable for delivering a signal of a pre-defined frequency to a frequency doubler 64 similar to doubler 46.

As previously mentioned, the second frequency translation means 30 is operable for translating the transmission frequency $f_i$ of the terminal 12 to a frequency $f_o$ compatible with that of the selected channel. The transmit frequency $f_i$ is delivered to high-pass filter 52, then to a mixer 54 where the translation frequency derived from one of the oscillator circuits 62 is mixed with the filtered transmit frequency and the resulting signal is delivered through low-pass filter 56 for amplification by amplifier 58, and is finally "cleaned-up" by low-pass filter 60. Similarly, one frequency band of the selected channel designated as $f_i$ is delivered to high-pass filter 34, thence to amplifier 36, and the resulting amplified signal is cleaned-up by high-pass filter 38. The amplified, clean signal is then delivered to mixer 44 where it is combined with a translation frequency generated by one of the oscillator circuits 44 to produce a receiving frequency $f_o$ which is then filtered by a low-pass filter 42 and delivered through modem 18 to receiver 20.

Means for selecting a particular channel over which communication is to take place includes a manually operable channel select switch 68 which generates a channel select signal that is processed by debouncing circuit 70 and is simultaneously delivered to a monostable multi-vibrator 72 and circuit means 74 for interrupting the transmission and reception of information at the terminal 12. Debounce circuit 70 merely functions to prevent more than one channel select signal from being developed by a single actuation of switch 68. The multivibrator 72 produces a single pulse output (one shot) which is delivered to the trigger input of a counter 76. Counter 76 maintains a count whose magnitude corresponds to the particular channel last selected. The count is advanced each time the channel select switch 68 is operated, such that successive actuations of switch 68 successively advances the count of counter 76. Counter 76 produces a binary output which is unique to each particular channel selected, which output is delivered to a decoder 78, and thence to the inputs of each of the oscillator circuits 44 and 62. In connection with the preferred embodiment illustrated in FIG. 2, the binary output of counter 76 comprises three data bits which allow selection of any of six channels, as well as a seventh channel which is a null or idle channel.

As indicated previously, the channel select signal is delivered from debounce circuit 70 to the transmit/receive interrupt circuit 74. Interrupt circuit 74 has an output on line 80 which is coupled with each of the RF switches 48 and 66, as well as to a ready light 82, the ready light 82 forming a part of a LED display 84 wherein a plurality of lights respectively associated with each of the six channel is provided. The signal produced on line 80 is of a prescribed time duration which exceeds the duration between successive resynchronization signals developed by the central station 10; the interrupt signal 80 functions to disable transmission and reception by the terminal 12 for this prescribed time duration by controlling the operation of RF switches 48 and 66. Thus, upon actuation of the channel select switch 68, interrupt circuit immediately disables transmission or reception by the terminal 12, and thereby effectively disconnects the terminal 12 from the channel to which it was previously connected. During the period of disablement, the counter 76 activates a pair of oscillators in the oscillator circuits 44 and 62 in order to develop the necessary translation frequencies corresponding to the channel recently selected. Subsequently, the interrupt signal on line 80 is terminated after the prescribed duration thereof and the multiple frequency oscillators 32 and 50 are then enabled to allow delivery of the translation frequencies corresponding to the recently selected channel to the mixers 40 and 54. At this point, the receiver 20 is enabled, while the transmitter 24 remains disabled by the control circuit 27. With the receiver 20 enabled and operative for receiving data from the central station 10 associated with the channel just selected, the receiver 20 eventually receives a resynchronization signal on the newly selected channel at which time the control circuit 27 re-enables the transmitter 24 in synchronization with the other terminals 12 operating on the same channel. The ready light 82 is normally illuminated, indicating that the transmitter 24 is enabled, and is turned off during the period that an interrupt signal is present on line 80. In the event that the channel select switch is actuated while an interrupt signal is present on line 80, the counter 76 is advanced to change channels. Typically, the interrupt signal on line 80 will remain present approximately one second which is sufficient to assure that the receiver 20, and more particularly that the control circuit 27 has lost the synchronization signal previously delivered by the old channel, so that the next synchronization signal received is that delivered by the newly selected channel.

In lieu of the manually operable channel select switch 68, channel selection may be accomplished by remote control in the following manner. A coded digital word comprising three data bits may be input to the counter 76 on data lines 86 from a source thereof while a strobe signal is input to the interrupt circuit 74 on line 88. The strobe signal on line 88 activates the interrupt circuit 74 to disable the receiver and transmitter 20 and 24 respectively while the counter 76 is advanced in accordance with the coded word delivered thereto.

Figure 4:
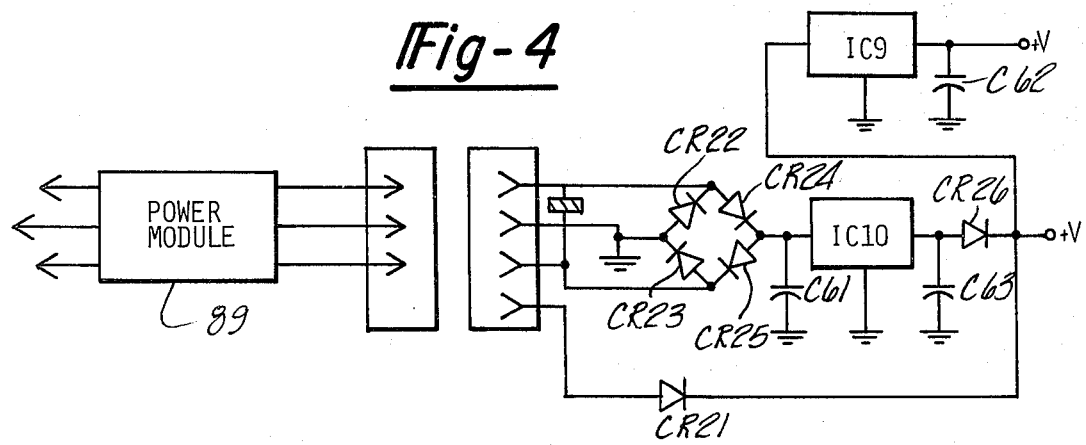
FIG. 4 is a detailed schematic diagram of a further portion of the circuit for the translator of FIGS. 1 and 2.
Figure 3B:
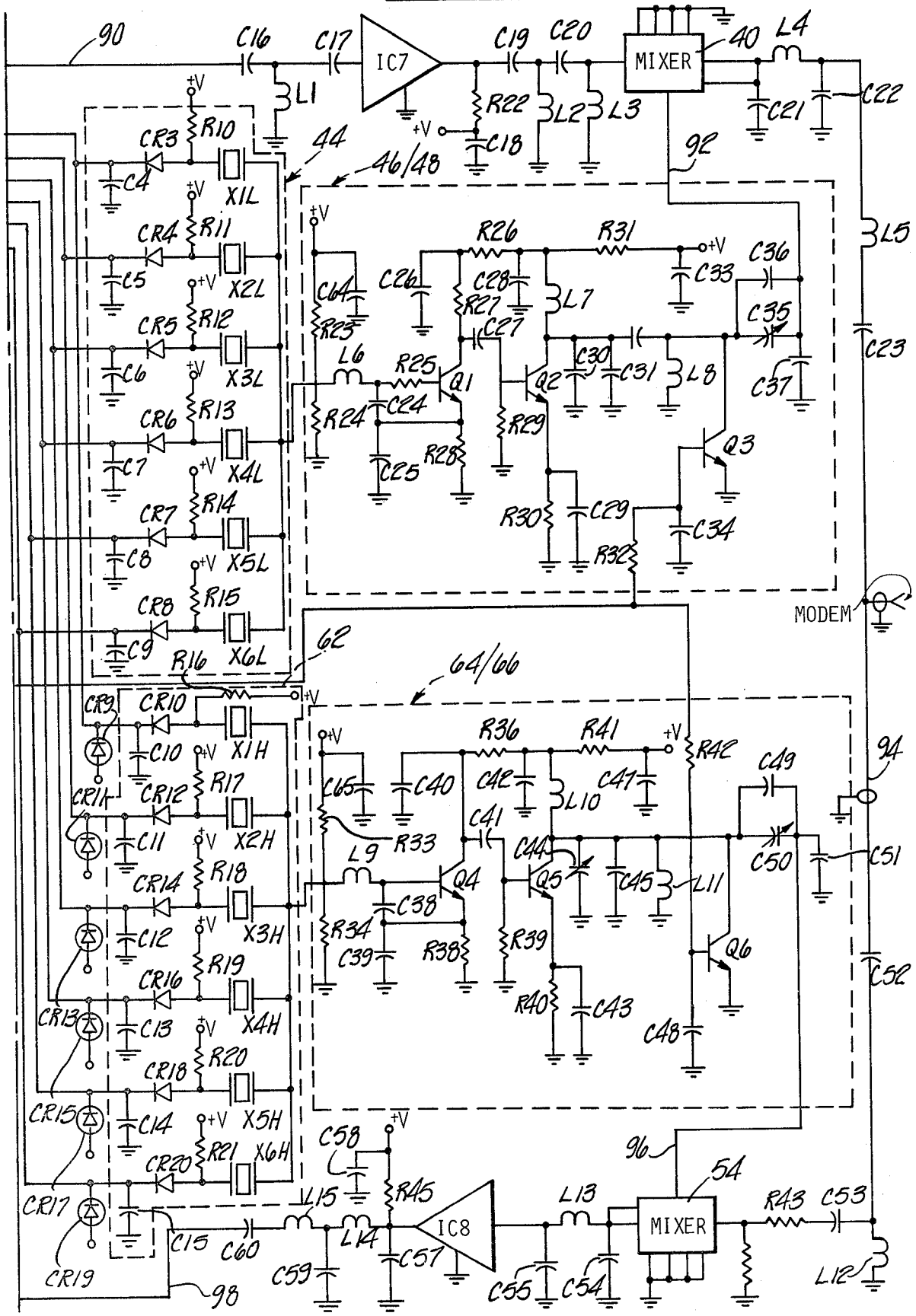

Turning attention now to FIGS. 3A, 3B and 4, power derived from a 110 volt source (not shown) is reduced by a transformer 89 to a lower voltage and is delivered through a rectifying bridge comprising diodes CR22, CR23, CR24 and CR25 to a pair of conventional voltage regulators IC9 and IC10, the outputs of of IC9 and IC10 providing the proper D.C. voltage for use at various points in the circuit. The incoming frequency band of the channel carried by line 14 is delivered on line 90 to the previously mentioned high-pass filter 34 which comprises inductor L1 and capacitors C16 and C17. The filtered signal is then delivered to amplifier IC7 which corresponds to amplifier 36 in FIG. 2, and the resulting amplified signal is filtered by a high-pass filter comprising inductors L2 and L3, and capacitors C19 and C20 which form the high-pass filter 38 shown in FIG. 2. The filtered signal is delivered to mixer 40, a second input to mixer 40 comprising line 92 which forms the output of RF switch 48 defined by transistor Q3. The conduction of transistor Q3 is controlled by the output of interrupt circuit 74, which comprises a monostable multi-vibrator. The translated frequency signal output by mixer 40 is filtered by a low-pass filter comprising capacitors C21 and C22, and inductors L4 and L5 which form the previously mentioned filter 42.

Outgoing transmission signals derived from the previously mentioned transmitter 24 are delivered on line 94 to a high-pass filter comprising capacitors C52 and C53 and inductor L12, which, in combination, comprise the previously mentioned filter 52. The filtered signal is delivered to one input of mixer 54, a second input to mixer 54 being line 96 which forms the output of the previously mentioned RF switch 66 which is defined by transistor Q6. The operation of transistor Q6 is controlled by the output of interrupt circuit 74 on line 110. The mixer 54 as well as mixer 40 are conventional devices of the double balanced type such as that manufactured by the Minicircuit Corporation and identified by the manufacturer's designation of SBL-1. The translated frequency signal is delivered from mixer 54 through a low-pass filter, previously designated by the numeral 56, which comprises capacitors C54, C55, C56 and inductor L13. The filtered signal is amplified by amplifier IC8 which comprises the previously mentioned amplifier 58. Finally, the amplified outgoing signal is processed by a low-pass filter (designated by the numeral 60 in FIG. 2 and is delivered on line 98 to the cable system).

In order to manually select a channel IC2 provides a normally low output signal on line 107 which is connected to an input of IC3 (designated by the numeral 76 in FIG. 2), as well as to one input of OR gate 108. The output of OR gate 108 is coupled to the trigger input of the monostable multi-vibrator, or one shot, 74 whose output comprises lines 110 and 112 respectively. The output of the one shot 72 on line 106 is normally low, but goes high when the switch 68 is actuated, and remains high for the duration of the one shot output thereof which may be approximately 50 milliseconds. This high output pulse immediately actuates the one shot 74. Line 112 delivers a disabling signal to a driver denoted by the designation IC6 to control the ready light CR2. Line 110 delivers the interrupt signal to the bases of transistors Q3 and Q6 which respectively form the RF switches 48 and 64. The signal on line 110 functions to disable the transmitter such that when subsequent channel switching is carried out, interference signals created by such channels switching are not transmitted on the communication line 14. The counter IC3 is actuated when the signal on line 106 reverts back to its normally low state, thereby initiating the change in channels after the transmitter has been disabled.

The output of counter IC3 is delivered by three data lines collectively noted by the numeral 114 to the inputs of decoder IC4. Decoder IC4 decodes the coded count on lines 114 and delivers an output signal on one of its seven output lines which are collectively designated by the numeral 116. The output of decoder IC4 delivered on one of the lines 116 is delivered through a driver IC6, thence to the input of each of the oscillator circuits 44 and 62. Each of the oscillator circuits 44 and 62 comprises, for example, a capacitor C4, a diode CR3, a resistor R10, and a crystal X1L. The previously mentioned display 84 is formed from a plurality of light emitting diodes CR9–CR19 coupled between the inputs of oscillator circuits 62 and the outputs of driver IC6.

Provision for remote control operation of the translator may be accomplished by coupling the plug 118 of an external control source to the input receptacle 120 which includes a ground terminal 122, strobe line 88 and three data lines 86. Lines 86 and 88 are coupled to the input of chip IC2 which comprises a conventional signal level translator for converting the signals present on plug 118 which are at TTL level to the CMOS level required by the remainder of the circuit components. The CMOS level output of IC2 form the inputs to counter IC3.

A jumper arrangement, broadly designated at 101, provides a reset signal to the counter 76 (IC3) in accordance with the number of channels which are being employed, i.e., when the highest channel number is reached, a reset signal is delivered through one of the lines of jumper 101 and NOR gates 103 and 105 to the reset input of counter 76.

From the foregoing, it is clear that the present invention provides a novel method of communicatively interfacing one of the terminals with all of the communication channels carried by line 14 which involves the steps of: selecting one of the channels; disabling the receiver and transmitter of the terminal a prescribed time interval after the channel has been selected; translating the frequency of the selected channel to that of the terminal's receiver; translating the frequency of the terminal's transmitter to that of the selected channel; enabling the terminal's receiver after it has been disabled for the prescribed duration; and then enabling the terminal's transmitter after its receiver has been enabled.

It is therefore apparent that the device and method for frequency translation described above not only provide for the reliable accomplishment of the objects of the invention, but do so in a particularly effective and simple manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. In a digital communications system including a plurality of master stations communicating with a plurality of terminals over a communications line carrying a plurality of communications channels each associated with one of said master stations, each of said terminals including a receiver and a transmitter operating on predetermined frequencies, a modem and means responsive to a request from any of the master stations for transmitting data information to that master station, each of said master stations including means for synchronously polling the terminals and for periodically delivering a resynchronizing signal to each of the terminals to synchronize the latter, a frequency translator for use with each of said terminals comprising:
   first frequency translator means for translating the frequency of a selected one of said plurality of channels to the frequency of the terminal's receiver, including:
   (1) multiple frequency oscillator means for producing a plurality of translation frequencies each associated with one of said channels, and
   (2) means for mixing each of said translator frequencies with the frequency of the corresponding channel;
   second translator circuit means for translating the frequency of the terminal's transmitter to the frequency of the selected channel, including:
   (1) multiple frequency oscillator means for producing a plurality of translator frequencies each associated with one of said channels, and
   (2) means for mixing each of said last named translation frequencies with the frequency of the corresponding channel,
   said first and second frequency translator circuit means being coupled between the modem of the associated terminal and said communications line; and
   selectively operable channel select means operably coupled with said first and second translator circuit means for selecting one of said channels to place the terminal in communication with the master station corresponding to said one channel.

2. The translator of claim 1, wherein said channel select means includes means for disabling the receiver and transmitter of the terminal for a prescribed time interval when said channel select means has been operated to select one of said channels, said time interval being greater than the duration between successive ones of said resynchronization signals.

3. The translator of claim 2, wherein said channel select means further includes:
   actuatable means coupled with said disabling means for causing said channel select means to select one of said channels,
   each of said multiple frequency oscillator means comprising a plurality of oscillator circuits for producing corresponding translator frequencies, and
   means coupled with each of said plurality of oscillator circuits and controlled by said actuatable means for selectively activating said plurality of oscillator circuits in a prearranged sequence.

4. The translator of claim 3, wherein said activating means comprises counter means for advancing a count each time said actuatable means is actuated, said count being associated with the channel being selected.

5. The translator of claim 4, including visual display means operably coupled with said activating means for producing a visual indication of the channel selected.

6. The translator of claim 3, wherein said actuatable means comprises a manually operable switch.

7. The translator of claim 3, wherein said actuatable means includes means for producing a plurality of output signals each corresponding to one of said channels in response to an input thereto comprising remotely generated, digital data.

8. The translator of claim 3, wherein said first and second frequency translators each further includes:
   means for mixing the corresponding translation frequency with the corresponding predetermined frequency,
   a high-pass filter circuit for filtering signals delivered to said mixing means,
   a low-pass filter circuit for filtering signals output from said mixing means, and
   an amplifier for amplifying at least certain of said signals,
   said multiple frequency oscillator means further comprising a circuit operably coupled with each of the corresponding oscillator circuits for doubling the frequency of the signals output from said last named circuits,
   said disabling means including means for disabling said mixing means.

9. The translator of claim 2, wherein said first and second frequency translator means are coupled in parallel relationship to each other.

10. In a digital communications system of the type including a plurality of master stations interrogating a plurality of synchronously responsive terminals over a single communications line carrying a plurality of duplex communications channels each associated with one of the master stations, each of the terminals having a receiver, a transmitter, and a modem and wherein each of the master stations periodically sends out a signal on its associated channel to resynchronize the terminals, a method of communicatively interfacing at least one of the terminals with all of said communications channels, comprising the steps of:
- (A) selecting one of said channels;
- (B) disabling the receiver and transmitter of said one terminal for a prescribed time interval following step (A);
- (C) translating the frequency of the channel selected in step (A) to the frequency of the receiver of said one terminal;
- (D) translating the frequency of said one terminal transmitter to the frequency of the channel selected in step (A);
- (E) enabling said one terminal's receiver after completing step (B);
- (F) enabling said one terminal's transmitter after completing step (E);
- (G) demodulating a communications signal received by said one terminal on said communications line after performing step (C); and
- (H) modulating a communications signal generated by the transmitter of said one terminal after performing step (D).

11. The method of claim 10, wherein step (A) is performed by the substeps comprising:
    (1) producing a count, the magnitude of said count corresponding to one of said plurality of channels, and
    (2) generating a pair of translation frequencies corresponding to said count.

12. The method of claim 11, wherein step (C) is performed by the substep of mixing one of said pair of translation frequencies with the frequency of the channel selected in step (A), and step (D) is performed by the substep of mixing the other of said translation frequencies of said pair thereof with the frequency of said terminal's transmitter.

13. The method of claim 11, wherein substep (1) is performed by:
    generating a digital word corresponding to the channel to be selected, and
    transforming said digital data word into said count.

14. The method of claim 11, wherein substep (1) is performed by:
    actuating a manually operable switch,
    producing a pulse upon each actuation of said switch, and
    advancing a counter using the pulses derived from the actuation of said switch.

15. A communications system comprising:
    a plurality of master stations for transmitting and receiving information on frequencies unique to each of said master stations;
    a plurality of terminals for communicating with said master stations and each including a transmitter and receiver having fixed transmitting and receiving frequencies different from any of said unique frequencies of certain of said master stations, each of said terminals including a modem for modulating and demodulating communications signals at said fixed frequencies;
    a multichannel communications line communicatively connecting said master stations with said terminals; and
    means at each of said terminals coupled between said communications line and the corresponding modem for translating the transmitting frequency of any of said master stations to the fixed receiving frequency of the associated terminal, and for translating the fixed transmitting frequency of said associated terminal to the receiving frequency of any of said master stations, whereby any of said master stations may communicate with any of said terminals.

16. The communications system of claim 15, wherein said communications line couples said terminals in parallel relationship to each of said master stations.

17. The communications system of claim 15, wherein said translating means includes:
    first frequency translator means for translating the transmitting frequency of any of said master stations to the fixed receiving frequency of the associated terminal, and
    second frequency translator means coupled in parallel relationship to said first frequency translator means for translating the fixed transmitting frequency of the associated terminal to the receiving frequency of any of said master stations.

18. The communications system of claim 17, wherein each of said first and second frequency translator means includes:
    multiple frequency oscillator means for producing a plurality of translation frequencies each associated with one of said unique transmitting and receiving frequencies, and
    means for mixing each of said translator frequencies with the corresponding fixed transmitting and receiving frequency of said associated terminal.

* * * * *